United States Patent [19]

Kang et al.

[11] Patent Number: 5,521,775
[45] Date of Patent: May 28, 1996

[54] FAST RUNNING MODE CONVERSION DEVICE FOR MAGNETIC RECORDING AND REPRODUCING APPARATUS

[75] Inventors: Seong-Sik Kang; Sung-Hoon Choi, both of Kyungki-Do; Myung-Cheol Baek, Seoul; Sung-Pyo Hong, Kyungki-Do; Ji Y. Lee; Lee H. Ryu, both of Seoul; Soo-Beom Lee, Kyungki-Do; Hee Y. Park, Kyungki-Do; Yoon-Sig Lee, Kyungki-Do, all of Rep. of Korea

[73] Assignee: Goldstar Co., Ltd., Seoul, Rep. of Korea

[21] Appl. No.: 309,187

[22] Filed: Sep. 20, 1994

[30] Foreign Application Priority Data

Sep. 27, 1993 [KR] Rep. of Korea .................. 19802/1993

[51] Int. Cl.⁶ .................................................. G11B 5/027
[52] U.S. Cl. .................................................. 360/85
[58] Field of Search ................................. 360/85, 105, 137

[56] References Cited

U.S. PATENT DOCUMENTS 4,674,001 6/1987 Takahashi et al. ...................... 360/137
4,896,234 1/1990 Watanabe et al. ...................... 360/137
4,984,105 1/1991 Hwang ........................................ 360/85
5,349,488 9/1994 Shibata et al. .......................... 360/105

*Primary Examiner*—Robert S. Tupper
*Assistant Examiner*—George J. Letscher

[57] ABSTRACT

A fast running mode conversion device for magnetic recording and reproducing apparatus. This device has a shaft supporter provided on the bottom surface of a base plate. An idler lifting lever for lifting or lowering an idler arm is pivotally mounted on the shaft supporter. A drive arm for driving the idler lifting lever is rotatably mounted on a shaft of the base plate. A biasing member coupled to the drive arm has a biasing lever for driving the idler lifting lever. The biasing lever extends toward the idler lifting lever. A function plate rectilinearly reciprocates by the rotating force of a cam gear, thus to turn the drive arm. The drive arm has an operating pin and the function plate has a pair of cam projections for cooperating with the operating pin when turning the drive arm.

3 Claims, 4 Drawing Sheets

FAST RUNNING MODE CONVERSION DEVICE FOR MAGNETIC RECORDING AND REPRODUCING APPARATUS

BACKGROUND OF THE INVENTION

1. Field of the Invention

The present invention relates in general to a fast running mode conversion device for magnetic recording and reproducing apparatus and, more particularly, to a structural improvement in such a mode conversion device for simplifying the construction of the device and lengthening the expected life span of the device.

2. Description of the Prior Art

With reference to FIG. 1, there is shown a typical reel drive mechanism for a magnetic recording and reproducing apparatus having a fast running mode conversion device. As shown in this drawing, the reel drive mechanism includes a clutch unit 40 which in turn comprises a reel drive gear 54 rotatably fitted over a shaft 42, which shaft 42 is fixedly fitted to and extends downwardly from a base plate 1. The reel drive gear 54 gears into a tape supply reel gear (not shown) of a tape supply reel assembly (not shown). Fitted over the shaft 42 under the reel drive gear 54 is a clutch gear 52. A pair of friction members 55 of the hollow disc type are disposed on and under the clutch gear 52 respectively. Fitted over the shaft 42 under the lower friction member 55 is a hollow disc 56. In order to bias the hollow disc 56 toward the reel drive gear 54 and to generate desired frictional force in the two friction members 55, a coil spring 57 is disposed about the shaft 42 under the disc 56. The lower end of the coil spring 57 is stopped by a fast running mode gear 53 which will be rotated at the same time of rotation of the reel drive gear 54. The position of the fast running mode gear 53 on the shaft 42 is retained by a spring washer 53a fitted over the shaft 42.

An idler unit 60 is placed by the right side of the clutch unit 40 as shown in FIG. 1. The idler unit 60 includes an idler arm 61 whose one end is rotatably fitted over a gear pulley shaft 60a, which shaft 60a is fixedly fitted to and extends downwardly from the base plate 1. The other end of the idler arm 61 is rotatably fitted over an idler shaft 61a by the side of the clutch unit 40, so that the idler arm 61 rotatably support an idler 62 which is fitted over the idler shaft 61a under the idler arm 61. Here, fitted over the lower end of the gear pulley shaft 60a is a gear pulley 68. The idler arm 61 and the idler 62 are coupled to each other by a piece of felt 65, a coil spring 64 and a washer 66, so that desired frictional torque is generated by all of the felt 65, the coil spring 64 and the washer 66 in response to motion of the idler arm 61.

The reel drive mechanism also includes a tape fast running mode conversion device 70 (hereinbelow, referred to simply as "the mode conversion device") placed on the top surface of the base plate 1. As best seen in FIG. 2, the mode conversion device 70 comprises a lifting lever 71. The lifting lever 71 is pivotally mounted on a bracket 41 so that the lever 71 selectively partially comes into contact with the top surface of the base plate 1. The mode conversion device 70 also comprises a turning lever 72 which is rotatably mounted on a shaft 72f fixed to the top surface of the base plate 1. The turning lever 72 is driven by a drive cam 76. The mode conversion device 70 further comprises a biasing member 73 placed on the turning lever 72. The biasing member 73 drives the lifting lever 71 in accordance with turning motion of the turning lever 72. The biasing member 73 is a nonlinear slender member whose center bent portion is rested against a pin 72b provided on the center portion of the turning lever 72. One end portion of the biasing member 73 is caught by a first stopper 72c provided on the from portion of the turning lever 72 while the other end portion of the biasing member 73 is caught by a second stopper 72d provided on the rear portion of the turning lever 72. The biasing member 73 thus elastically lies across the turning lever 72 with the one end of the member 73 projecting out of the front end of the lever 72 to a length L.

The drive cam 76 is provided with an annular cam slot 77 of a predetermined depth. This cam slot 77 extends beside the outer edge of the cam 76. A cam pin 75 which is provided on the end of the turning lever 72 is movably received in the cam slot 77 of the drive cam 76. As shown in FIG. 2, the turning lever 72 is biased by a tension coil spring 74 so that the lever 72 is biased so as to be turned clockwise about its rotating shaft 72f (FIG. 1). The one end of the spring 74 is connected a spring hook 72a provided on the rear end of the lever 72 but the other end of the spring 74 is connected to an appropriate portion of the base plate 1.

In operation of the above reel drive mechanism, the turning lever 72 of the mode conversion device 70 is turned in accordance with rotating motion of the drive cam 76. As a result of the turning motion of the turning lever 72, the biasing member 73 pushes the lifting lever 71, thus to make the idler arm 61 of the idler unit 60 be lowered toward the gear pulley 68 (see FIG. 1 ). As the idler arm 61 is lowered as described above, a small idler gear 62a of the idler 62 coupled to the arm 61 is disengaged from the clutch gear 52. At this time, a large idler gear 62b of the idler 62 is engaged with the fast running mode gear 53, thus to start a fast running mode, that is, the FF mode or the REW mode.

That is, when the idler 62 is engaged with the clutch gear 52, the drive force of a motor (not shown) is transmitted, with a torque less than the predetermined level because of slip, to the reel drive gear 54 gearing into an output gear 51. In this case, a reel table (not shown) is rotated at a low speed in the same manner as a reproducing mode, that is, the normal-direction reproducing mode or the reverse-direction reproducing mode. However, when the idler 62 is engaged with the fast running mode gear 53, the drive force of the motor is transmitted to the reel drive gear 54 with no slip. The reel table in this state is thus rotated at a high speed, thus to start a desired fast running mode.

As described above, the typical fast mode conversion device of the reel drive mechanism includes the biasing member 73 for pushing and driving the lifting lever 71. The mode conversion device also includes the tension coil spring 74 for elastically returning both the turning lever 72 and the biasing member 73. The mode conversion device should be thus complicated in its construction. In addition, the non-linear shape of the biasing member 73 is very complicated. The bending portion of the biasing member 73, which bending portion is applied with bending force when pushing the lifting lever 71, is short so that the biasing member 73 should be overloaded when pushing and driving the lifting lever 71. That is, the length L between the front end of the biasing member 73 and the first stopper 72c provided on the front portion of the turning lever 72 is short so that driving of the lifting lever 71 should be attended with large force. Another problem of the mode conversion device resides in that the biasing member 73 is such a simple cantilever that the member 73 is easily deformed and deteriorates the operational reliability of the magnetic recording and reproducing apparatus.

SUMMARY OF THE INVENTION

It is, therefore, an object of the present invention to provide a fast running mode conversion device for magnetic recording and reproducing apparatus in which the above problems can be overcome and which not only improves the operational reliability when converting the mode of the apparatus into a fast running mode by lowering an idler arm but also simplifies the construction of the mode conversion device.

In order to accomplish the above object, a fast running mode conversion device for a magnetic recording and reproducing apparatus in accordance with a preferred embodiment of the present invention comprises: a shaft supporter extending downward from the bottom surface of a base plate of a reel drive mechanism of the apparatus; an idler lifting lever for lifting or lowering an idler arm of the reel drive mechanism, the lifting lever being pivotally mounted on the shaft supporter; a drive arm for driving the idler lifting lever, the drive arm being rotatably mounted on a shaft extending from the bottom surface of the base plate; a biasing member coupled to the drive arm, the biasing member having a biasing lever for driving the idler lifting lever, the biasing lever extending toward the idler lifting lever; and a function plate for turning the drive arm, the function plate rectilinearly reciprocating by rotating force of a cam gear.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
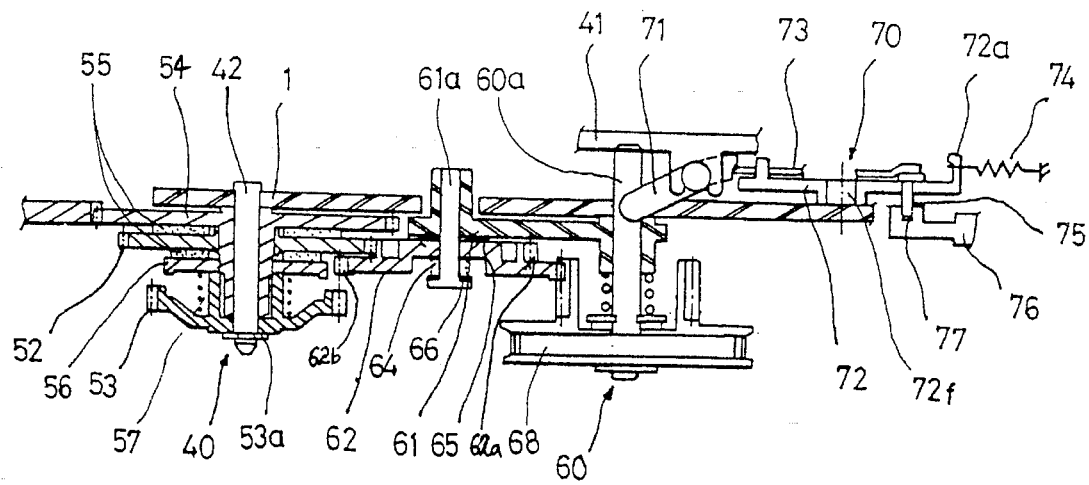
FIG. 1 is a sectional view showing a construction of a conventional drive mechanism of magnetic recording and reproducing apparatus having a typical fast running mode conversion device.
Figure 2:
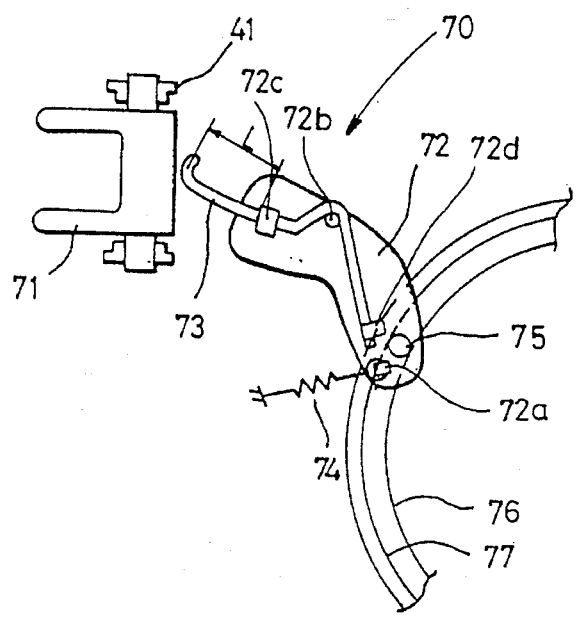
FIG. 2 is a plan view showing the relation between a turning lever, a biasing member and a lifting lever of the fast running mode conversion device of FIG. 1.
Figure 3:
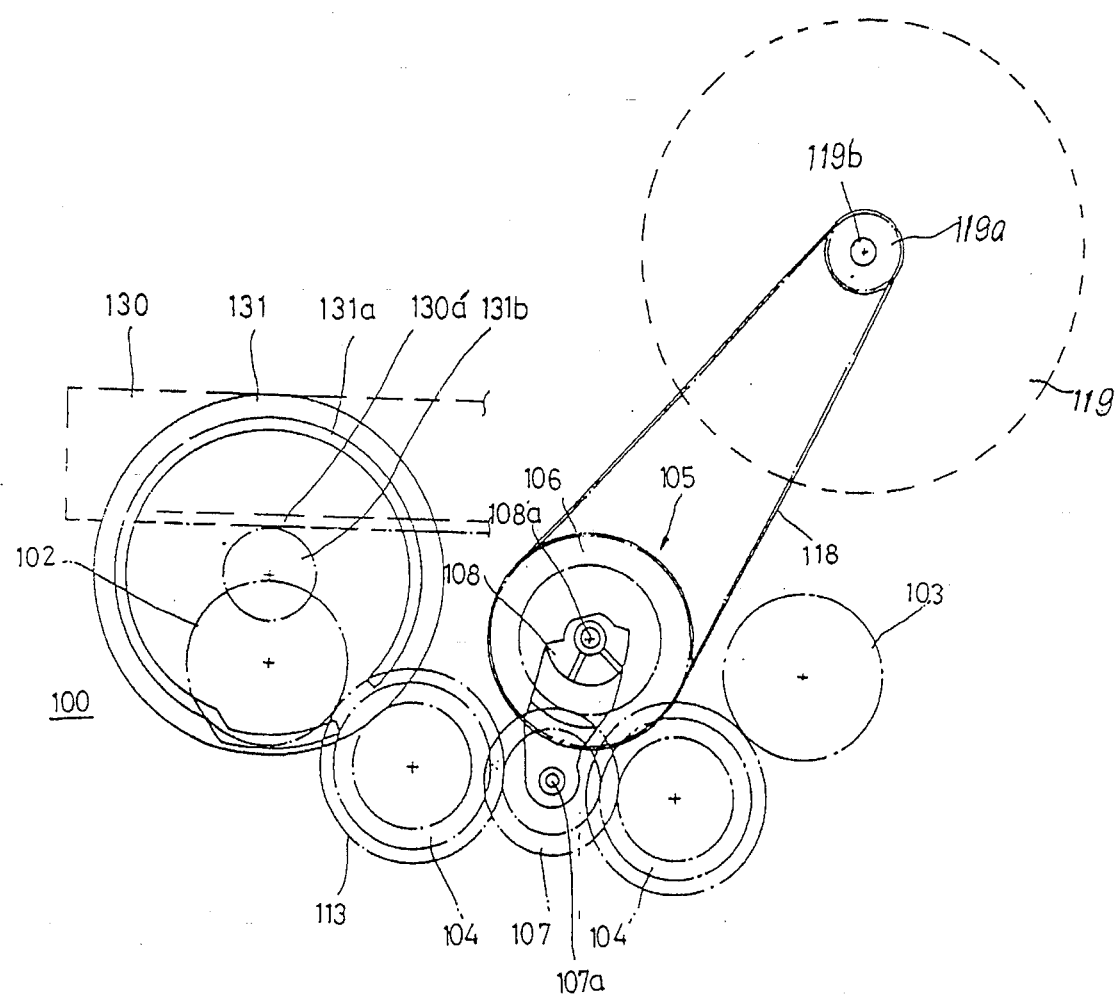
FIG. 3 is a schematic plan view showing a construction of a reel drive mechanism of a magnetic recording and reproducing apparatus having a fast running mode conversion device in accordance with a preferred embodiment of the present invention.

Referring first to FIG. 3, there is shown a construction of a reel drive mechanism of a magnetic recording and reproducing apparatus having a fast running mode conversion device in accordance with a preferred embodiment of the present invention. The drive mechanism includes a capstan motor 119 (shown in phantom because it lies below base plate 100). The capstan motor drives a capstan shaft 119b. Fitted over the capstan shaft 119a above the top surface of the base plate 100 is a pulley 119a. An input gear pulley 106 is placed on the bottom center of a mode conversion function plate 130, (shown in phantom is lines due to it being below the base plate 100. The gear pulley 106 is connected to the pulley 119a of the capstan motor 119 through a belt 118 wrapped about both the pulleys 106 and 119a. The gear pulley 106 is rotatably mounted on a shaft 108a downwardly extending from the base plate 1.

Figure 4:
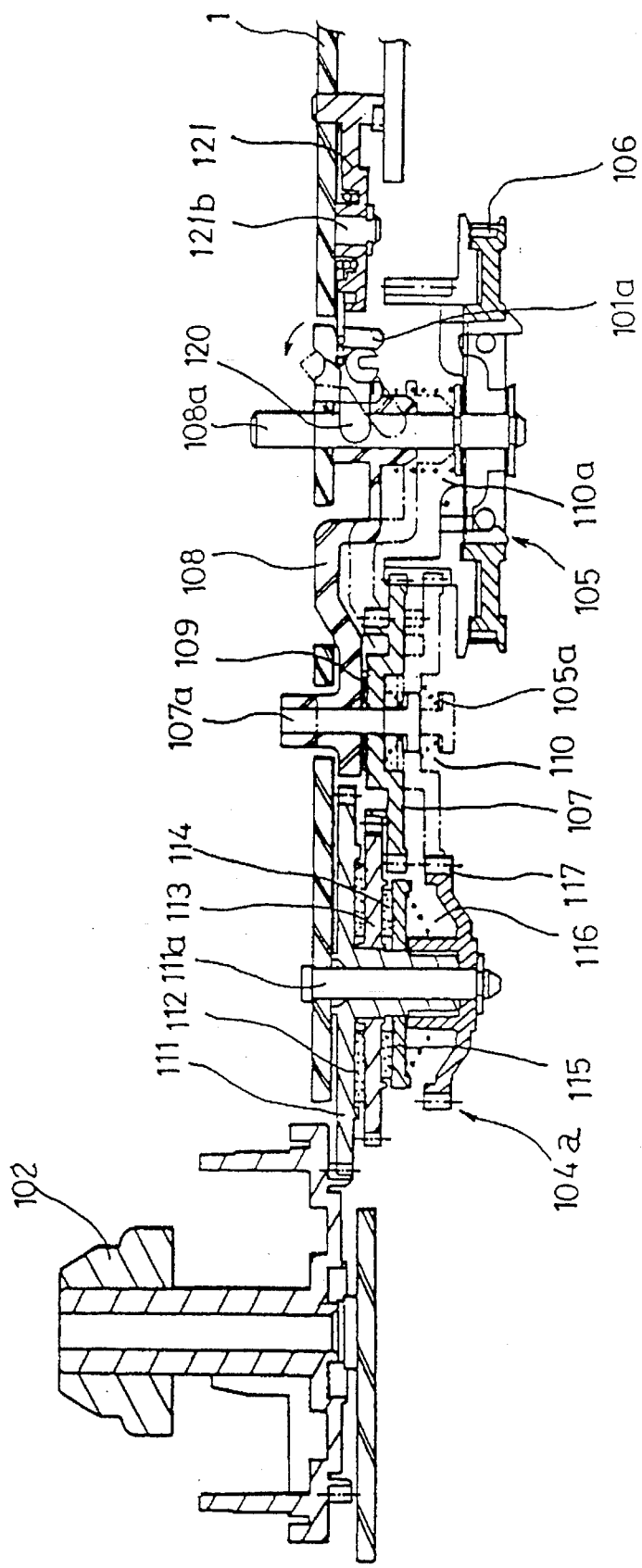
FIG. 4 is a sectional view of the reel drive mechanism of FIG. 3.

The drive mechanism also includes a polygonal idler arm 108 whose one end is connected to the shaft 108a of the gear pulley 106 as shown in FIG. 4. The gear pulley 106 is fitted over the shaft 108a with a spring 110a placed about the shaft 108a between the bottom surface of the idler arm 108 and the top surface of the gear pulley 106. Mounted on the bottom surface of a front section of the idler arm 108 is a friction member 109. An idler 107 is fitted over a shaft 107a mounted on the front section of the idler arm 108. Fitted over the shaft 107a under the idler 107 are a coil spring 110 and a washer 105a.

As shown in FIGS. 3 and 4, a pair of clutches of a tape supply reel clutch 104(a) and a tape take-up reel clutch 104(b) are placed by both sides of the idler 107 respectively. The tape supply reel clutch 104 comprises a drive force output gear 111, a first friction member 112, a clutch gear 113, a second friction member 114, a washer 115, a coil spring 116 and a no-slip drive gear 117 directly coupled to the drive force output gear 111. All of the above elements of the clutch 104 are fitted over a shaft 111a fixed to the base plate 100 in order.

The drive mechanism further includes an idler mechanism 105 comprising the input gear pulley 106, the idler arm 108, both fitted over the shaft 108a. The idler mechanism 105 also includes the idler 107 fitted over the idler shaft 107a, which shaft 107a in turn is coupled to the idler arm 108. With the above structure of the drive mechanism, the idler 107 is selectively engaged with either the tape supply reel clutch 104(a) or the tape take-up reel clutch 104(b) in accordance with a rotating direction of the gear pulley 106 rotated by the rotating force of an additional drive force source, for example, a motor. Either the tape supply reel assembly 102 or the tape take-up reel assembly 103 is thus driven. Here, the rotating force of the additional drive force source is transmitted to the gear pulley 106 through the belt 118.

In accordance with the above structure, a normal-direction reproducing mode or a reverse-direction reproducing mode may be started when the idler 107 of the idler mechanism 105 is engaged with the clutch gear 113 of the clutch 104(a) as shown in FIG. 4. Meanwhile, when the idler 107 is engaged with the no-slip drive gear 117 of the clutch 104, a fast running mode or one of the FF mode and the REW mode may be started. The idler arm 108 is lifted or lowered by additional lifting means, which lifting means will be described later herein, thus to make the idler 107 be engaged with either the clutch gear 113 or the no-slip drive gear 117 in accordance with a mode of the magnetic recording and reproducing apparatus. From the above description, it will be noted that the reel drive force transmission system according to the present invention is similar to the prior system.

Figure 5:
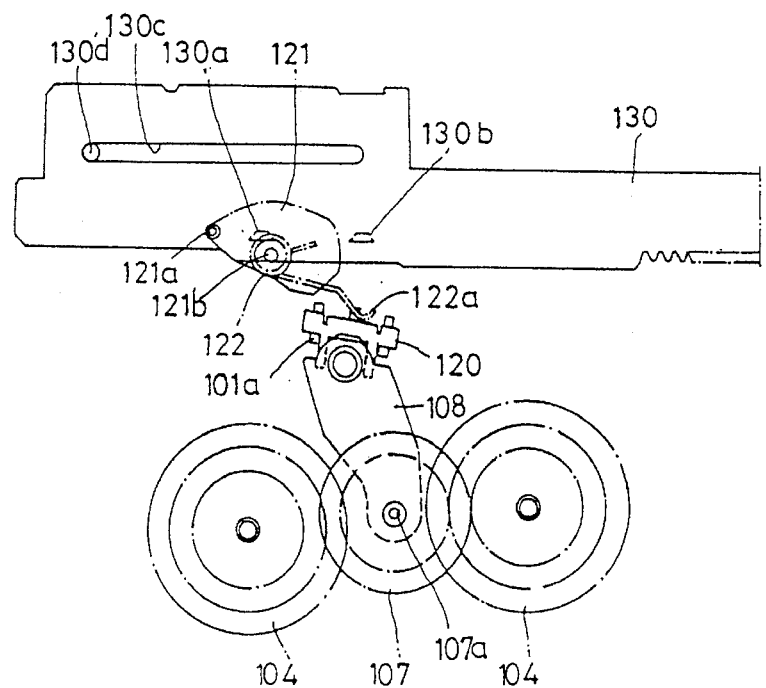
FIG. 5 is a plan view showing the fast running mode conversion device of FIG. 3 in a reproducing mode.
Figure 6:
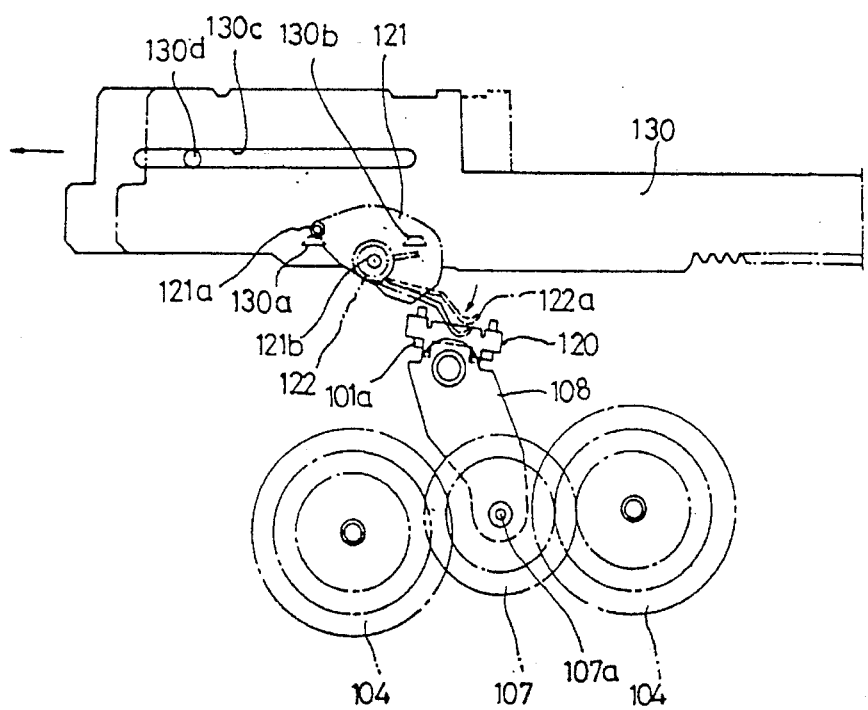
FIG. 6 is a plan view showing the fast running mode conversion device of FIG. 3 in a fast running mode.

Turning to FIGS. 5 and 6, there is shown the fast running mode conversion device of the present invention. As shown in the drawings, the mode conversion device includes a shaft supporter 101a which extends downward from the bottom surface of the base plate 100 of FIG. 4. Pivotally mounted on the shaft supporter 101a is an idler lifting lever 120 for lifting or lowering the idler arm 108. The mode conversion device also includes an idler lifting lever drive arm 121 which is rotatably mounted on a shaft 121b fixed to the bottom surface of the base plate 100. A biasing member 122 is coupled to the idler lifting lever drive arm 121. The biasing member 122 has a biasing lever 122a for driving the lifting lever 120. The biasing lever 122a extends from the shaft 121b toward the idler lifting lever 120. The mode conversion device further includes the mode conversion function plate 130 which rectilinearly reciprocates in accordance with rotating motion of a cam gear 131. The mode conversion function plate 130 rotates the lever drive arm 121 while rectilinearly reciprocating.

The mode conversion function plate 130 is mounted on the center of the bottom surface of the base plate 100 by a pin (not shown). The function plate 130 is provided with a rack gear 130a which gears into a center pinion gear 131b of the cam gear 131. The surface of the cam gear 131 is provided with a cam slot 131a as shown in FIG. 3. This cam slot 131a extends beside the outer edge of the cam 131.

One end portion of the lever drive arm 121 has an operating pin 121a. At this time, the operating pin 121a of the drive arm 121 is guided, under certain restriction, by a guide slot (not shown) provided in the function plate 130. In order to guide the operating pin 121a under certain restriction as described above, the function plate 130 includes a pair of cam projections, that is, first and second cam projections 130a and 130b. With the first cam projection 130a, the drive arm 121 is turned clockwise about its shaft 121b when the function plate 130 rectilinearly moves rightwards as shown in FIG. 6. In the above mode conversion device, the biasing member 122 preferably uses a torsion spring which is coiled around the shaft 121b at least one time.

In the drawings, the reference numeral 130d denotes a guide pin provided on the base plate 100 and the numeral 130c denotes a guide slot which is provided in the function plate 130 for movably receiving the guide pin 130d therein. With the guide pin 130d and the guide slot 130c, the function plate 130 rectilinearly reciprocates on the base plate 100 under the guide of the guide pin 130d.

In operation of the magnetic recording and reproducing apparatus, the rotational force of the capstan motor 119 is transmitted to the gear pulley 106 of the idler mechanism 105 through the pulley 119a of the capstan motor shaft 119b. The idler 107 is thus engaged with either the clutch gear 104 of the supply reel assembly 102 or the clutch gear 104(b) of the take-up reel assembly 103 in accordance with rotating direction of the capstan motor 119, thus to drive either the tape supply reel assembly 102 or the tape take-up reel assembly 103. Therefore, either the tape supply reel or the tape take-up reel takes up the magnetic tape (not shown) thereon, so that the apparatus carries out one of the normal-direction reproducing mode, the reverse-direction reproducing mode, the normal-direction fast running mode or the reverse-direction fast running mode.

In the state shown in the solid line of FIG. 4 or in FIG. 6, the idler 107 of the idler mechanism 105 is engaged with the clutch gear 113 of the supply reel assembly 102. When converting the mode into a fast running mode, the function plate 130 moves leftward from the position shown at the solid line of FIG. 5 by an additional drive force. The operating pin 121a of the idler lifting lever drive arm 121 thus comes into contact with the first cam projection 130a of the function plate 130, so that the drive arm 121 starts to be turned clockwise about the shaft 121b. As a result of the clockwise turning motion of the drive arm 121, the biasing lever 122a of the biasing member 122 pushes the lower portion of the idler lifting lever 120 so that the lever 120 is turned counterclockwise from the solid line position to the dotted line position of FIG. 4. The idler arm 108 is thus lowered from the solid line position to the dotted line position of FIG. 4, thus to disengage the idler 107 from the clutch gear 113 but to engage the idler 107 with the no-slip drive gear 117 of the supply reel clutch 104.

Here, the no-slip drive gear 117 and the output gear 111 of the supply reel clutch 104 can not be independently rotated but can be simultaneously rotated as described above. The drive force, which has been transmitted through the shaft 107a of the idler mechanism 105, is thus transmitted, without slip, to the supply reel assembly 102 through all of the idler 107, the no-slip drive gear 117 and the output gear 111. The supply reel assembly 102 is, therefore, rotated at a high speed and carries out the fast running mode. In the fast running mode, the direction of the mode, that is, FF mode or REW mode, is influenced by the rotating direction of the capstan motor 119.

When converting the mode from the fast running mode into a reproducing mode, the function plate 130 moves rightward from the position shown in FIG. 6. The idler arm 108 elastically returns, due to restoring force of the spring 110a of the idler mechanism 105, from the dotted line position to the solid line position of FIG. 4 just after separation of the operating pin 121a of the idler lifting lever drive arm 121 from the first cam projection 130a of the function plate 130. At this time, the biasing lever 122a as well as the lifting lever drive arm 121 elastically returns to its original position by the restoring force of the spring 110a. The idler 107 of the idler mechanism 105 is engaged with the clutch gear 113 of the supply reel clutch 104. In this state, the magnetic recording and reproducing apparatus starts the normal-direction reproducing mode or the reverse-direction reproducing mode.

As described above, all of the idler arm, the idler lifting lever, the biasing member and the idler lifting lever drive arm of the fast running mode conversion device according to this invention are driven by spring force, so that the number of parts of the device is reduced and the construction of the device is simplified. The device is low in its height, so that the apparatus achieves the recent trend of compactness.

Furthermore, the biasing member uses a torsion spring which is coiled around the drive arm shaft at least one time. The bending portion of the biasing lever of the biasing member of this invention, which bending portion is applied with bending force when pushing the lifting lever, is long so that the lifting lever can be readily driven by small force. The biasing member is thus scarcely deformed even when used for a long time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fast running mode conversion device for a magnetic recording and reproducing apparatus comprising:

an idler mechanism including an idler, an idler shaft, and an idler arm, said idler fitting over the idler shaft, the idler shaft coupled to the idler arm, said idler mechanism for engaging selectively with a supply reel or a take-up reel;

an idler lifting or lowering means for lifting or lowering said idler mechanism, said idler lifting or lowering means contacting said idler mechanism;

a drive arm for driving said idler lifting or lowering means;

a biasing member coupled to the drive arm, said biasing member having a biasing lever for driving the idler lifting or lowering means, said biasing lever extending toward the idler lifting or lowering means;

a function plate having a means for rotating said drive arm, said function plate being rectilinearly reciprocated on a base plate by an additional driving source;

said drive arm having an operating pin and said means for rotating comprising cam projections on the function plate, the operating pin cooperating with the cam projections so as to rotate said drive arm.

2. The fast running mode conversion device according to claim 1, wherein there are two cam projections on the function plate.

3. The fast running mode conversion device according to claim 1, wherein said biasing member is a torsion spring, said torsion spring being coiled around a mounting shaft of the drive arm at least one time.

* * * * *